(12) United States Patent
Wang et al.

(10) Patent No.: US 11,920,044 B2
(45) Date of Patent: Mar. 5, 2024

(54) SELF-HEALING PROTOCURABLE ELASTOMERS FOR ADDITIVE MANUFACTURING

(71) Applicant: UNIVERSITY OF SOUTHERN CALIFORNIA, Los Angeles, CA (US)

(72) Inventors: Qiming Wang, Los Angeles, CA (US); Kunhao Yu, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 926 days.

(21) Appl. No.: 16/794,663

(22) Filed: Feb. 19, 2020

(65) Prior Publication Data

US 2020/0263045 A1   Aug. 20, 2020

Related U.S. Application Data

(60) Provisional application No. 62/807,605, filed on Feb. 19, 2019.

(51) Int. Cl.
| | |
|---|---|
| *B33Y 10/00* | (2015.01) |
| *C08G 77/20* | (2006.01) |
| *C08K 5/37* | (2006.01) |
| *C08K 5/5397* | (2006.01) |
| *C09D 11/101* | (2014.01) |
| *C09D 11/102* | (2014.01) |
| *B33Y 40/20* | (2020.01) |
| *B33Y 50/02* | (2015.01) |
| *B33Y 70/00* | (2020.01) |

(52) U.S. Cl.
CPC ............ *C09D 11/101* (2013.01); *C08G 77/20* (2013.01); *C08K 5/37* (2013.01); *C08K 5/5397* (2013.01); *C09D 11/102* (2013.01); *B33Y 10/00* (2014.12); *B33Y 40/20* (2020.01); *B33Y 50/02* (2014.12); *B33Y 70/00* (2014.12)

(58) Field of Classification Search
None
See application file for complete search history.

(56) References Cited

U.S. PATENT DOCUMENTS

2007/0123642 A1\*  5/2007  Banning et al.

OTHER PUBLICATIONS

Nguyen, K. D., Megone, W. V., Kong, D. & Gautrot, J. E.: Ultrafast diffusion-controlled thiol-ene based crosslinking of silicone elastomers with tailored mechanical properties for biomedical applications. Polym. Chem. 7, 5281-5293 (2016) (Year: 2016).\*
Acosta Ortiz R., et al.: Self-Healing Photocurable Epoxy/thiol-ene Systems Using an Aromatic Epoxy Resin. Adv. Mater. Sci. Eng. vol. 2016, Article ID 8245972 (2016) (Year: 2016).\*
Wallin, T. et al. : "Click chemistry stereolithography for soft robots that self-heal", J. Mater. Chem. B 5, 6249-6255 (2017) (Year: 2017).\*

\* cited by examiner

*Primary Examiner* — Mohammad M Ameen
(74) *Attorney, Agent, or Firm* — SNELL & WILMER LLP

(57) ABSTRACT

A method of making an ink for use in additive manufacturing of a self-healing product includes providing a thiol material. The method further includes oxidizing the thiol material to form a thiol-disulfide oligomer. The method further includes applying an alkene material to the thiol-disulfide oligomer to allow a thiol-ene reaction and form a self-healing ink embedded with a disulfide bond.

12 Claims, 8 Drawing Sheets

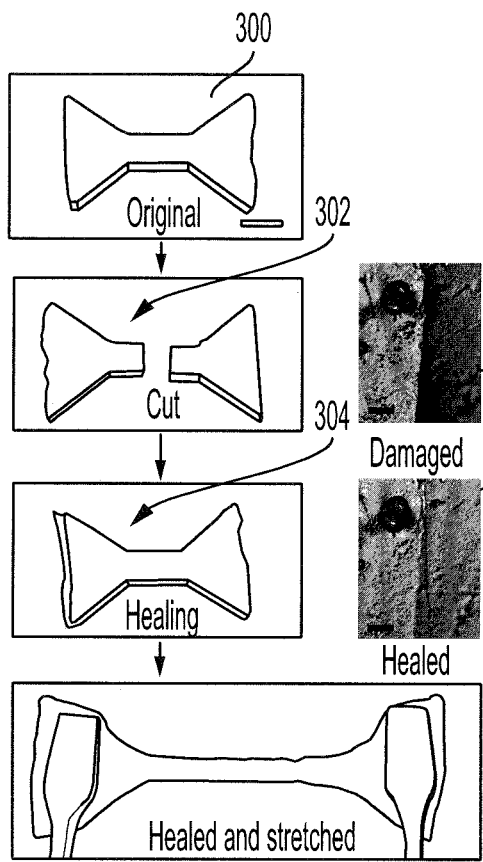
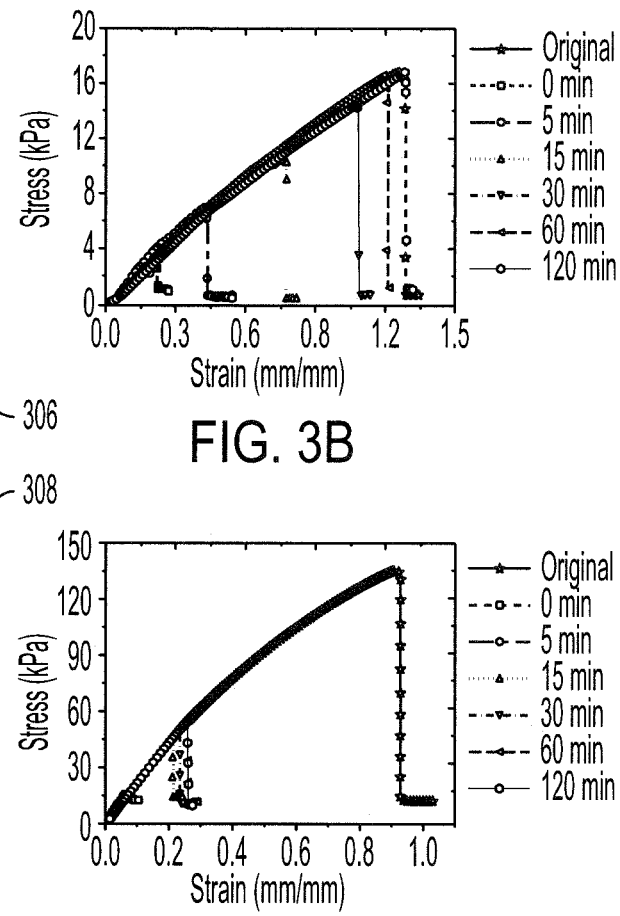
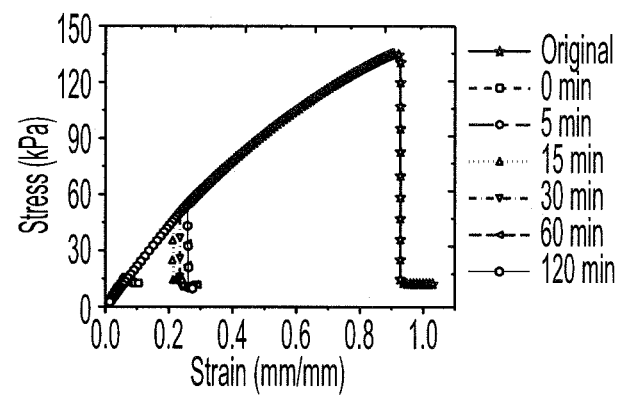
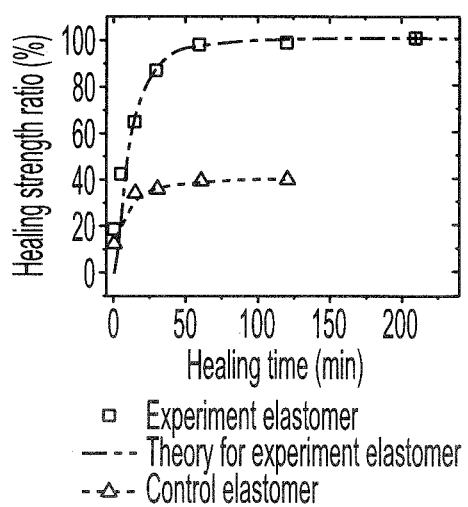
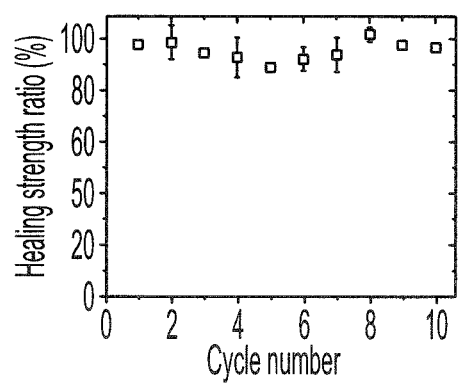
FIG. 3A
FIG. 3B
FIG. 3C
FIG. 3D
FIG. 3E

SELF-HEALING PROTOCURABLE ELASTOMERS FOR ADDITIVE MANUFACTURING

CROSS-REFERENCE TO RELATED APPLICATIONS

This application claims the benefit and priority of U.S. Provisional Application No. 62/807,605, entitled "SELF-HEALING PHOTOCURABLE ELASTOMERS FOR ADDITIVE MANUFACTURING," filed on Feb. 19, 2019, the entire disclosure of which is hereby incorporated by reference herein in its entirety.

STATEMENT AS TO FEDERALLY SPONSORED RESEARCH

This invention was made with government support under contract numbers FA9550-18-1-0192 awarded by the Air Force Office of Scientific Research (AFOSR) and 1762567 awarded by the National Science Foundation (NSF). The government has certain rights in this invention.

BACKGROUND

1. Field

The present disclosure is directed to self-healing ink and, more particularly, to self-healing ink and additively manufacturing three-dimensional objects using the self-healing ink.

2. Description of the Related Art

Natural living materials, such as animal organs, can autonomously self-heal wounds. Inspired by natural living materials, scientists have developed synthetic self-healing polymers capable of repairing fractures or damages at the microscopic scale and restoring mechanical strengths at the macroscopic scale. The healing capability usually relies on extrinsic curing-agent encapsulates released upon fractures or on intrinsic dynamic bonds, such as dynamic covalent bonds and physical bonds, that autonomously reform after fracture-induced dissociations. Thanks to their healing capability, these polymers have enabled a wide range of applications, such as flexible electronics, energy transducers, soft robotics, lithium batteries, water membranes, and biomedical devices. Despite the success in syntheses and applications, the existing self-healing polymers are still facing a critical bottleneck—deficiency in 3D shaping. This bottleneck makes synthetic self-healing polymers different from living materials (such as human organs) that usually feature functional geometries and microstructures. Additionally, several promising applications of self-healing polymers demand complex 2-dimensional and/or three-dimensional (2D/3D) architectures, such as soft robotics, structural composites, and architected electronics. However, the architecture demand of self-healing polymers has not been sufficiently fulfilled, as the existing 3D methods of shaping self-healing polymers include only molding and direct writing, which are either time consuming or limited in their formation of complex 3D architectures.

SUMMARY

Disclosed herein is a method of making an ink for use in additive manufacturing of a self-healing product. The method includes providing a thiol material. The method further includes oxidizing the thiol material to form a thiol-disulfide oligomer. The method further includes applying an alkene material to the thiol-disulfide oligomer to allow a thiol-ene reaction and form a self-healing ink embedded with a disulfide bond.

Also disclosed is a method of making an ink for use in additive manufacturing of a self-healing product. The method includes forming an oxidizer solution by mixing iodonium salts with toluene. The method further includes applying at least one of a photoinitiator or a photoabsorber to the thiol-disulfide oligomer to allow a thiol-ene reaction and form a self-healing ink embedded with a disulfide bond.

Also disclosed is a method of additive manufacturing a self-healing product using a self-healing ink. The method includes creating or obtaining a computer-aided-design (CAD) model of a biphase composite. The method further includes splitting the CAD model into two models with respective phases. The method further includes slicing each of the two models into an image sequence with a prescribed spacing along a vertical direction. The method further includes sequentially projecting the image sequence onto a resin bath filled with the self-healing ink. The method further includes exposing the self-healing ink to image light to solidify the self-healing ink to form a layer structure bonded to a printing stage.

BRIEF DESCRIPTION OF THE DRAWINGS

Other systems, methods, features, and advantages of the present invention will be or will become apparent to one of ordinary skill in the art upon examination of the following figures and detailed description. Additional figures are provided in the accompanying Appendix and described therein.

FIGS. 3A-3E illustrate various characterizations of a self-healing property of a component resulting from the method 100 of FIGS. 1A and 1B, according to various embodiments of the present disclosure;

DETAILED DESCRIPTION

Figure 1A:
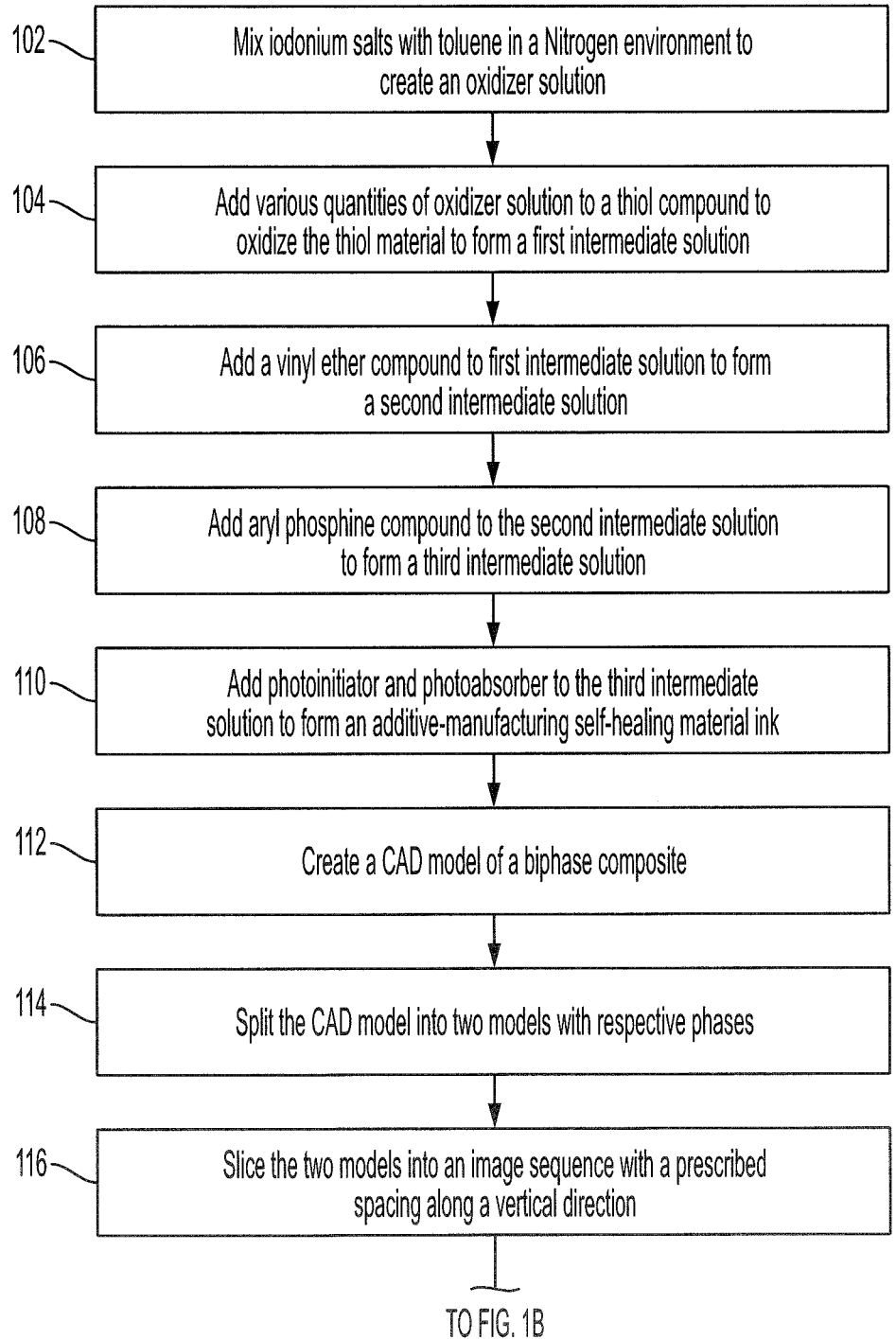
FIGS. 1A and 1B are flowcharts illustrating a method of forming a self-healing ink usable for additive manufacturing and for forming a self-healing structure using the self-healing ink, according to various embodiments of the present disclosure.

The present disclosure is directed to systems and methods of forming a self-healing ink usable for additive manufacturing, and for forming a self-healing structure by additively manufacturing the structure with the self-healing ink. Nature excels in both self-healing and three dimensional (3D) shaping; for example, self-healable human organs feature functional geometries and microstructures. However, tailoring man-made self-healing materials into complex structures faces substantial challenges. The present disclosure presents a paradigm of photopolymerization-based additive manufacturing of self-healable elastomer structures with free-form architectures. The paradigm relies on a molecularly designed photoelastomer ink with both thiol and disulfide groups, where the former facilitates a thiol-ene photopolymerization during the additive manufacturing process and the latter enables a disulfide metathesis reaction during the self-healing process. The present disclosure shows that the competition between the thiol and disulfide groups governs the photocuring rate and self-healing efficiency of the photoelastomer. The self-healing behavior of the photoelastomer is understood with a theoretical model that agrees with experimental results. With projection microstereolithography systems, the present disclosure demonstrates rapid additive manufacturing of single material and multi-material self-healable structures for 3D soft actuators, multiphase composites, and architected electronics. Compatible with various photopolymerization-based additive manufacturing systems, the photoelastomer is expected to open promising avenues for fabricating structures where free-form architectures and efficient self-healing are both desirable.

The present disclosure describes a strategy for photopolymerization-based additive manufacturing (AM) of self-healing elastomer structures with free-form architectures. The strategy relies on a molecularly designed photoelastomer ink with both thiol and disulfide groups, where the former facilitates a thiol-ene photopolymerization during the additive manufacturing process and the latter enables a disulfide metathesis reaction during the self-healing process. Using projection microstereolithography systems, the disclosure demonstrates the rapid additive manufacturing of single and multi-material elastomer structures in various 3D complex geometries within a short time (e.g., 0.6 millimeters (mm)×15 mm×15 mm/min=13.5 mm$^3$/min). These structures can rapidly heal the fractures and restore their initial structural integrity and mechanical strengths to 100 percent (100%). It was found that the competition between the thiol and disulfide groups governs the photocuring rate and self-healing efficiency of the photoelastomer. The self-healing behavior of the photoelastomer is understood with a theoretical model that agrees well with the experimental results. To demonstrate potential applications of the three-dimensional (3D)-printable self-healing elastomers, the disclosure presents a self-healable 3D soft actuator that can lift a weight ten times its own weight, a nacre-like stiff-soft composite that restores the toughness to over 90% after fracture, and a self-healable force sensor with both dielectric and conductive phases. Equipped with the capability of rapid photopolymerization that is compatible with various additive manufacturing systems, such as stereolithography, self-propagation photopolymer waveguide, two-photon lithography, and PolyJet printing, the new self-healing photoelastomer system is expected to open promising avenues for fabricating structures where free-form architecture and efficient self-healing are both desirable.

Figure 1B:
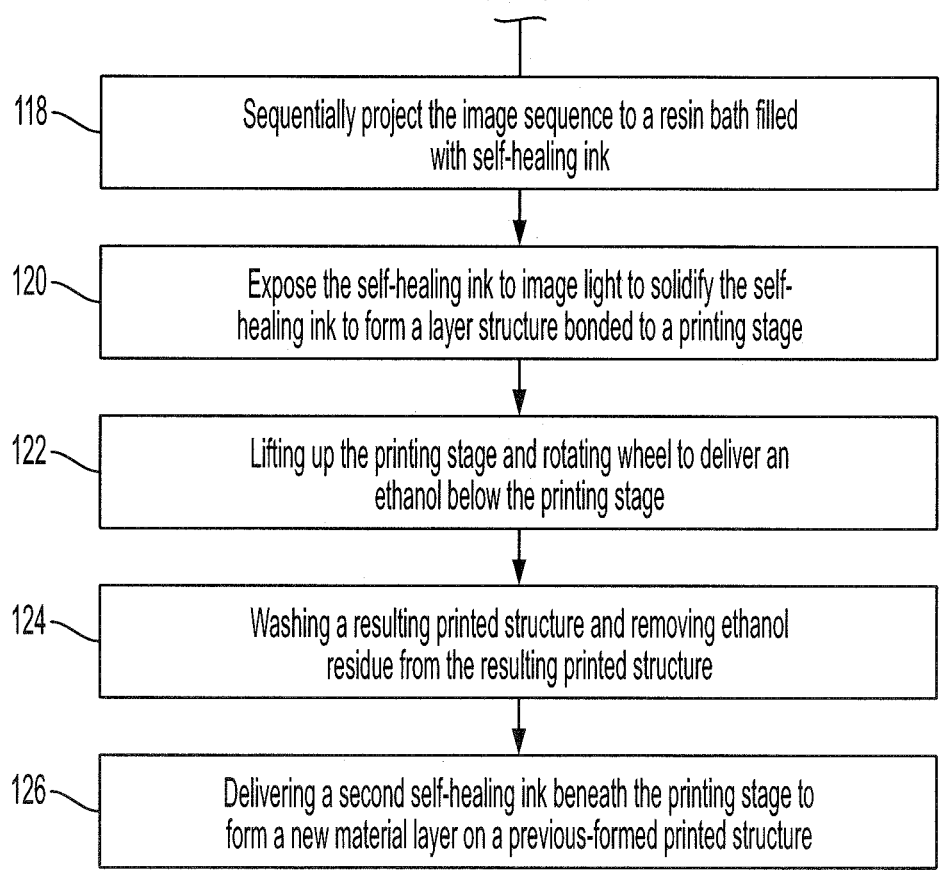

FIGS. 1A and 1B illustrate a method 100 of forming a self-healing ink usable for additive manufacturing, and for forming a self-healing structure by additively manufacturing the structure with the self-healing ink. The method 100 illustrated in FIGS. 1A and 1B outline the process of forming and using the self-healing ink; additional details regarding the steps will be provided in the discussion below.

In block 102, iodonium salts may be mixed with toluene in a nitrogen environment to create an oxidizer material. In some embodiments, the iodonium salts may include Iodobenzene Diacetate (IBDA).

In block 104, various quantities of an oxidizer solution may be added to a thiol compound to oxidize the thiol material to form a first intermediate solution. In block 106, a vinyl ether compound may be added to the first intermediate solution to form a second intermediate solution. In block 108, an aryl phosphine may be added to the second intermediate solution to form a third intermediate solution.

In block 110, the third intermediate solution may include at least one of a photoinitiator or a photoabsorber, which may include at least one of Sudan I or phenylbis(2,4,6-trimethylbenzoyl)phosphine oxide. That is, the photoinitiator and the photoabsorber may be added to the third intermediate solution. As will be described in the rest of the method 100, the self-healing ink may be used for 3D printing a self-healing component or element.

In block 112, a computer aided design (CAD) model of a bi-phase composite may be created. In block 114, the CAD model may be split into two models with respective phases of the biphase composite. However, in various embodiments, a CAD model of a single-phase composite may be created; in this case, the CAD model may not be split.

In block 116, the two models may be sliced into an image sequence with a prescribed spacing along a vertical direction. In block 118, the image sequence may be sequentially projected into a resin bath filled with the self-healing ink.

In block 120, the self-healing ink may be exposed to image light in order to solidify the self-healing ink (thus curing the self-healing ink). This exposure to light may form a layer structure bonded to a printing stage. In some embodiments, the photocuring time for each layer using the material described herein may be less than 15 seconds, less than five seconds, less than one second, or the like. It is desirable for the photocuring time to be relatively small to reduce the total time to additively manufacture the component. This relatively short photocuring time of the self-healing ink described herein is thus beneficial.

In block 122, the printing stage may be lifted up and a wheel may be rotated in order to deliver an ethanol below the printing stage. In block 124, a resulting printed structure may be washed in order to remove any ethanol residue from the resulting printed structure.

In block 126, a second layer of self-healing ink may be delivered beneath the printing stage. This second layer of self-healing ink may result in a new material layer on the previously formed printed structure. This second layer may then be exposed to image light to cure the second layer. This process may be repeated multiple times based on the CAD model.

After all layers of the self-healing ink have been delivered, the cleaned resulting printed structure is now a self-healing component.

The method 100 may be used to create multiple types of self-healing components. For example, the method 100 may be used to create a self-healing actuator, self-healing electronics, or the like, as described below.

Various materials may be used in forming the self-healing ink described in the method 100. The method 100 was tested and found to provide desirable results. In the example tests described herein, the materials included vinyl-terminated polydimethylsiloxanes (V-PDMS, molar mass 6000-20,000 grams per mol (g/mol)) and [4-6% (mercaptopropyl) methylsiloxane]-dimethylsiloxane (MMDS). The materials further included include Iodobenzene diacetate (IBDA), toluene, tributylphosphine (TBP), 1,6-hexanediol diacrylate (HDDA), phenylbis(2,4,6-trimethylbenzoyl)phosphine oxide (a photoinitiator), Sudan I (a photoabsorber), and ethanol. Carbon grease may further be utilized. The materials were purchased and utilized without any further purification.

Table 1 below illustrates chemical alternatives to those described in the above paragraph which will provide similar results.

TABLE 1

| Used chemicals | Key chemical group | Alternative with similar function |
|---|---|---|
| Vinyl-terminated polydimethylsiloxanes (V-PDMS, molar mass 6000-20,000 g/mol) | vinyl ether compound | Poly(ethylene glycol) divinyl ether |
| [4-6% (mercaptopropyl)methylsiloxane]-dimethylsiloxane (MMDS) | Thiol compound | Pentaerythritol tetrakis(3-mercaptopropionate) |
| Iodobenzene diacetate (IBDA) | iodonium salts | [Hydroxy(tosyloxy)iodo]benzene |
| tributylphosphine (TBP) | aryl phosphines | triphenylphosphine |
| phenylbis(2,4,6-trimethylbenzoyl)phosphine oxide | Photoinitiator | diphenyl (2,4,6-trimethylbenzoyl)-phosphine oxide |
| Sudan I | Photoabsorber | Eusorb UV-1995 |

The tests followed the below procedure for manufacturing the self-healable ink. Zero point 5 (0.5) grams (g) of IBDA was first mixed with 5 milliliters (mL) of toluene in a nitrogen environment with magnetic stirring for 6 hours. Next, 1 g of MMDS was oxidized by adding different amounts of the IBDA solution (0 g, 0.35 g, 0.7 g, 1 g, and 1.2 g) for 1 minute. Subsequently, 1.95 g of V-PDMS, 1 percent by weight (1 wt %) of a photoinitiator, and 0.1 wt % of a photoabsorber were added and mixed for another 1 minute. Next, 0.1 wt % of TBP was then added and mixed for another 1 minute. To prepare the control elastomer ink, 1 g of MMDS, 1.95 g of V-PDMS, 1 wt % photoinitiator, and 0.1 wt % photoabsorber were mixed for 5 minutes. Raman spectroscopy measurements were performed using a Horiba Raman infrared microscope with an acquisition time of 1 minute. The spectra of the material inks from 200 to 1800 centimeters $(cm)^{-1}$ were collected using a laser excitation wavelength of 532 nanometers (nm).

Table 2 below illustrates a potential chemical composition range that will provide similar results to the experimental setup.

TABLE 2

| Used chemicals | Best concentration | Possible mass range |
|---|---|---|
| Vinyl-terminated polydimethylsiloxanes (V-PDMS, molar mass 6000-20,000 g/mol) | 1.95 g | 0.5-3 g |
| [4-6% (mercaptopropyl)methylsiloxane]-dimethylsiloxane (MMDS) | 1 g | 0.5-2 g |
| Iodobenzene diacetate (IBDA) solution (0.5 g IBDA + 5 ml toluene) | 1 g | 0.35 g-1.5 g |
| tributylphosphine (TBP) | 0.00395 g | 0.001975 g-0.0079 g |
| phenylbis(2,4,6-trimethylbenzoyl)phosphine oxide | 0.0395 g | 0.01975 g-0.1975 g |
| Sudan I | 0.00395 g | 0.001975 g-0.01975 g |

Next, the steps of the experiment regarding the additive manufacturing using the self-healing ink will be described.

To fabricate the multimaterial structures, the computer-aided design (CAD) model of a bi-phase composite was formed and split into two models with respective phases. Each phase model was then sliced into an image sequence with a prescribed spacing in the vertical direction. Then, two image sequences were alternatively integrated into one image sequence. The images were sequentially projected onto a resin bath that was filled with the material ink discussed above. The ink capped with a motor-controlled printing stage was exposed to the image light (405 nm) and solidified to form a layer structure bonded to the printing stage. As the printing stage was lifted up, the wheel was rotated to deliver the ethanol beneath the printing stage. With the printing stage lowered into the ethanol, the printed structure was washed, and the ethanol residue was subsequently absorbed by a cotton pad. Then, another material ink was delivered beneath the stage by the rotational wheel. By lowering the stage by a prescribed height and illuminating another image, a second material layer could be printed on the existing structures. By repeating these processes, multi-material structures were printed. To fabricate single-material structures, the process may be simplified by using one image sequence and removing the intermediate cleaning process.

It is to be noted that a traditional stereolithography system with acrylic-based resins has an oxygen-rich layer to quench the photopolymerization close to the printing window, and this oxygen-rich layer can facilitate the manufacturing process by reducing the adhesion between the printed part and the window. However, the thiol-ene photopolymerization system may not be quenched by the oxygen. To enable easy separation between the solidified part and the window, a Teflon® membrane with a low surface tension (~20 millinewtons per meter (mN/m)) may be used to enable low separation forces. In addition, all fabricated samples were heated for 2 hours at 140 degrees Fahrenheit (60 degrees Celsius) to remove the residual toluene and ethanol and then post-cured in a UV chamber for an additional 1 hour (at the same wavelength as the additive manufacturing system) to ensure the samples were fully polymerized.

A 10 millimeter (mm) by 10 mm square image was illuminated on the printing window using different photo-exposure times for the experimental elastomers with various IBDA concentrations. The thicknesses of the photocured parts were measured at the cross-sections by using an optical microscope (e.g., a Nikon® ECLIPSE LV100ND).

A self-healing test of the samples was executed. The dog-bone-shaped samples (thickness 4 mm) were first additively manufactured. Then, the samples were cut into two pieces with a blade and brought into contact with an additional force (~0.5 N) on two sides to ensure good contact. The samples were then put on a hot plate at 140 degrees Fahrenheit (60 degrees Celsius) for various healing times. Both the original and healed samples were clamped by using two rigid plates in a tensile testing machine (e.g., an Instron 5942) to be uniaxially stretched until rupture with a low strain rate of $0.06 \text{ s}^{-1}$. The microscopic images of the damaged and healed interfaces were taken with an optical microscope (e.g., a Nikon® Eclipse LV100ND).

Next, a mechanical test of the experimental elastomer was performed. The storage and loss moduli of the experimental elastomer at frequencies of 0.1 to 10 Hertz (Hz) and temperatures of 77 to 329 degrees Fahrenheit (25 to 165 degrees Celsius) were tested using a dynamic mechanical analyzer (e.g., TA instrument RSA III). The cyclic tensile tests of the experimental elastomer were conducted using an Instron 5942 with a low strain rate of $0.006 \text{ s}^{-1}$.

The self-healing ink was used to form a self-healable actuator. The 3D actuator was first designed and additively manufactured. A 10 g weight was hung at the bottom of the actuator that was connected to a syringe pump. When the syringe pump was moved, the weight was lifted up. A camera was used to image the distance change of the weight. Then, the actuator was cut in half with a blade and contacted back to heal for 2 hours at 140 degrees Fahrenheit (60 degrees Celsius). Once healed, the actuator was used to lift the 10 g weight again for multiple cycles.

A self-healable composite was also formed and tested. The experimental composites (having a width of 10 mm, a length of 15 mm, and a thickness of 1 mm) with stiff phase HDDA and soft phase self-healing elastomer were first additively manufactured. Then, a small notch was made at the center edge of the samples. The notched samples were clamped and stretched in the Instron tensile tester with a low strain rate of $0.06 \text{ s}^{-1}$. The first group of control samples included pure HDDAs and self-healing elastomers that were the same size as the experimental composites. The second group of the control samples included composite samples with stiff phase HDDA and soft phase non-self-healing elastomer (also the same size as the experimental composites). These two control sample groups underwent similar tensile tests as the experimental composites.

A self-healable electronic device was also formed and tested. The self-healable conductive elastomer ink was synthesized by adding 50 wt % carbon grease to the self-healing elastomer ink. The self-healable conductive elastomer samples were fabricated using the single-material stereolithography system. A University of Southern California (USC) Trojan pad was fabricated (having a width of 10 mm, a length of 10 mm, and a thickness of 1 mm) with the dielectric phase self-healing elastomer and the conductive phase conductive elastomer using the multi-material stereolithography system. The resistance was measured with a source meter (e.g., a Keithley 2400). The voltage (10 volts (V) of alternating current (AC)) for powering a light emitting diode (LED) was provided by the source meter. The force sensor was fabricated by laminating the Trojan pad between two same-size, self-healable elastomer pads. A compressive force was applied and measured by the Instron machine with two plastic compression plates.

Figure 2A:
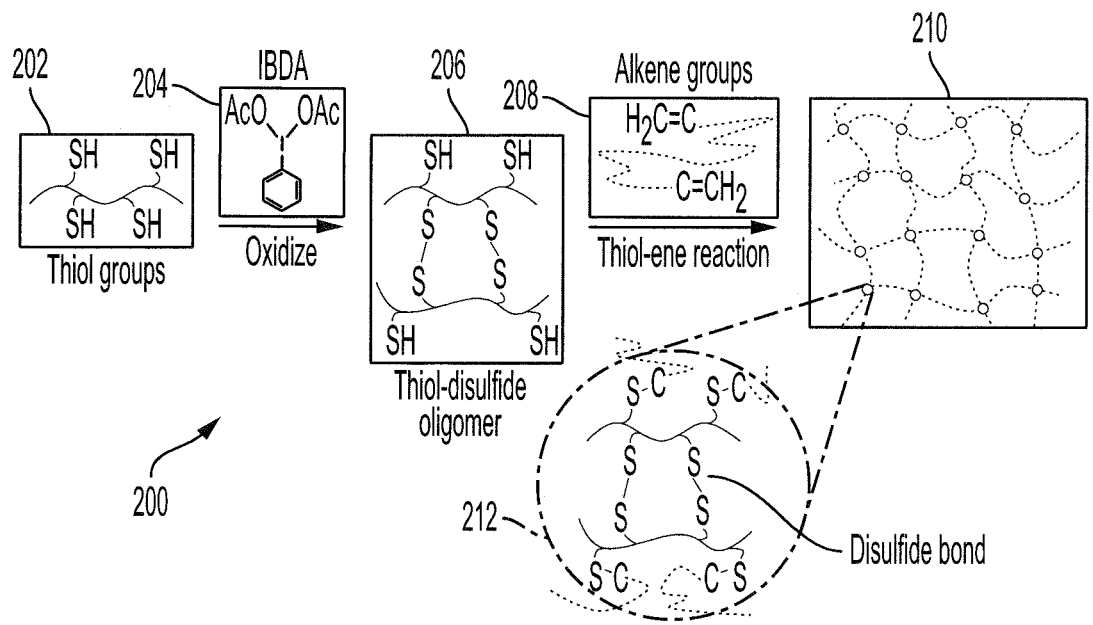
FIGS. 2A-2E illustrate various features and results of the method of FIGS. 1A and 1B, according to various embodiments of the present disclosure.

Results of the experiment will now be described. The results will begin with a discussion regarding the molecular design of the self-healing photoelastomer. The molecular design of the self-healing elastomer with integrated photopolymerization and self-healing features is based on the coexistence of thiol (R—S—H) and disulfide (R—S—S—R') groups (as shown in a process 200 of FIG. 2A). In particular, FIG. 2A illustrates the molecular design of the self-healing elastomer. MMDS with thiol groups 202 were oxidized with IBDA 204 to form a thiol-disulfate oligomer 206. The oligomer 206 then undergoes a photoinitiated thiol-ene reaction with the V-PDMS with alkene groups 208 to form a solid elastomer 210 with disulfide bonds 212.

Figure 2B:
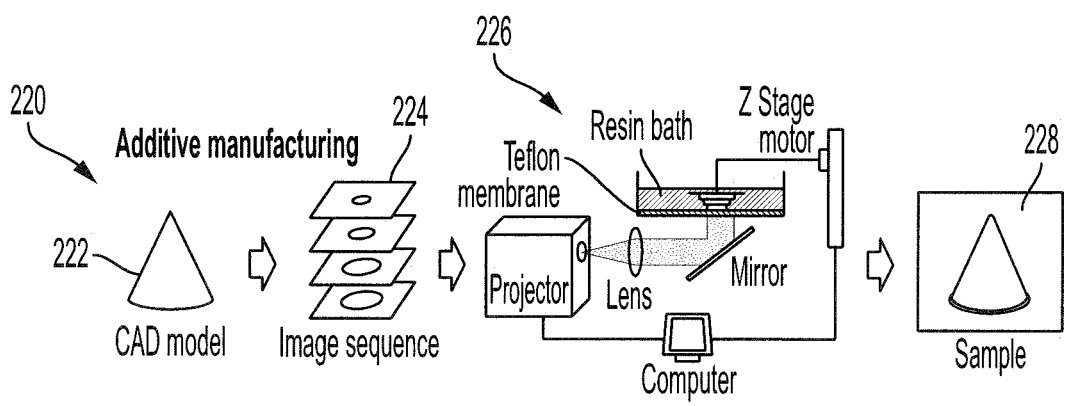

The photopolymerization was achieved by harnessing the high-rate and high-yield thiol-ene crosslinking reaction in which the thiol groups (R—S—H) and alkene groups (H2-C=C—HR') react to form alkyl sulfides (R—S—C—C—H2R') under the photoinduced radical initiation (as shown in FIGS. 2A and 2B). FIG. 2B illustrates a process 220 for stereolithography-based additive manufacturing using the self-healing ink 206, 208. In particular, a CAD model 222 was generated. The CAD model 222 was split into an image sequence 224, which was then sequentially projected onto a resin bath 226. The result of the resin bath 226 is a layer-by-layer sample 228.

Figure 2C:
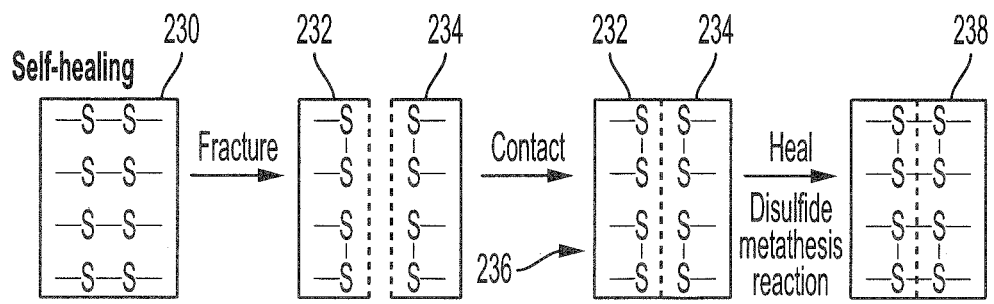

Efficient self-healing is achieved by harnessing dynamic disulfide bonds that undergo disulfide metathesis reactions (assisted by a catalyst tributylphosphine) to bridge the fractured interface (as shown in FIG. 2C). As shown, the original sample 228 has disulfide bonds 230. The disulfide bonds 230 were split into a first portion 232 and a second portion 234 when fractured. The first portion 232 and the second portion 234 were then brought into contact with each other, as shown in an image 236. After a period of healing, a disulfide metathesis reaction occurred, resulting in the healed sample 238.

To introduce the disulfide groups in the polymer network, thiol groups were partially oxidized using a highly efficient oxidant, iodobenzene diacetate (IBDA). After the partial oxidation, the thiol and disulfide groups coexist in the material ink to form thiol-disulfide oligomers. After the photopolymerization, the dynamic disulfide bonds will be covalently integrated within the crosslinker regions.

Figure 2D:
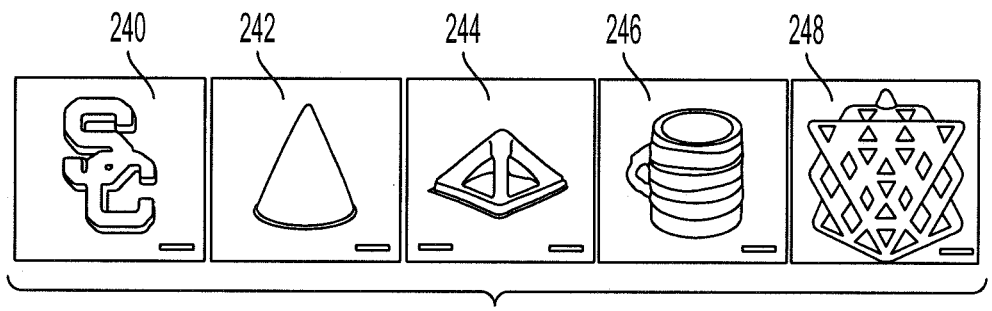

To prove the concept, 4-6% (mercaptopropyl) methylsiloxane]-dimethylsiloxane copolymer (MMDS, FIG. 2A) was employed with vinyl-terminated polydimethylsiloxane (V-PDMS) to provide the thiol groups and alkene groups, respectively. Both chemicals have relatively low viscosities (below 200 centistokes (cSt)) that are suitable for the stereolithography process. VPDMS, which has a relatively high molar mass (6000-20,000 g/mol), constitutes the polymer backbone and enables the high flexibility and stretchability of the elastomer. The material ink is used in a projection microstereolithography system to enable the rapid prototyping of various 2D/3D elastomer structures as shown in FIG. 2D, including a logo of the University of Southern California 240, a circular cone 242, a pyramid 244, a cup 246, and an octet truss lattice 248. The scale bars in FIG. 2D represent 4 mm.

Figure 2E:
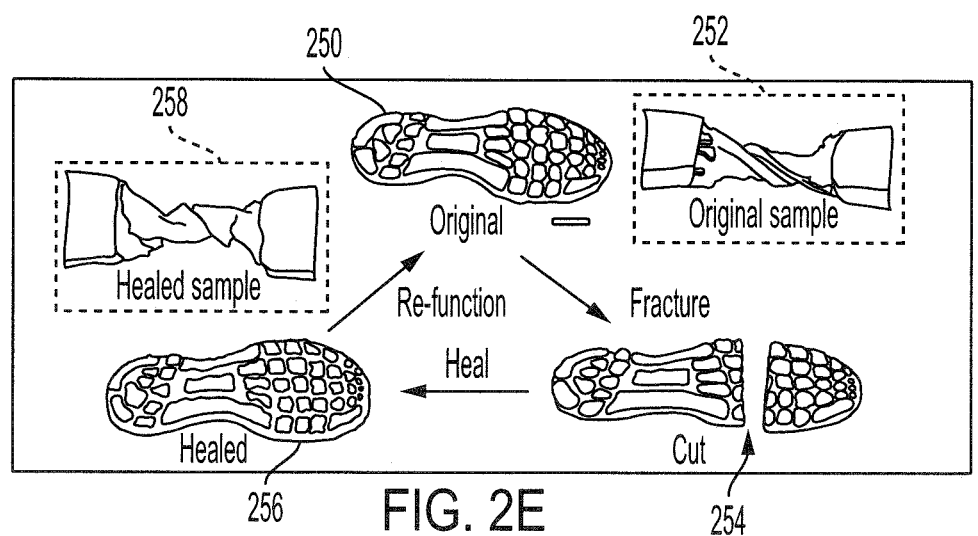

The manufacturing process is rapid with a speed of approximately 25 micrometers per second (μm/s) for each layer and approximately 5 to 60 minutes for each structure shown in FIG. 2D. The manufacturing resolution can reach as low as 13.5 μm. The elastomer not only can be three dimensionally (3D) printed to nearly any 3D architecture but can also self-heal fatal fractures. As a simple demonstration in FIG. 2E, a delicately patterned shoe pad 250 was fabricated that can be flexibly twisted by 540 degrees 252. The pad was then cut into two parts 254 and contacted back to heal for 2 hours at 140 degrees Fahrenheit (60 degrees Celsius). After the healing process, the sample 256 can sustain the 540-degree twist 258 again.

Next, the self-healing property of the synthesized photoelastomer is characterized (as shown in FIGS. 3A-3E). Two types of photoelastomers were designed: experimental elastomers with IBDA enabled disulfide bonds and control elastomers without the disulfide bonds. Both elastomer inks can be 3D printed into bone-shaped samples 300. Then, the samples were cut into two parts 302 and brought into contact 304 for various healing times (0 to 270 minutes) at 140 degrees Fahrenheit (60 degrees Celsius) to heal 304. Subsequently, the samples were uniaxially stretched until ruptured. The damaged interface 306 and healed interface 308 are also shown.

The self-healing property of the experimental elastomer can be verified from three aspects. First, the existence of the disulfide bond in the experimental elastomer was verified by Raman spectroscopy measurements that show a new peak with a band at approximately 520 cm'. This new band is consistent with the Raman band in the reported disulfide bond-enabled self-healing polymers (500 to 550 cm$^{-1}$). Second, microscopic images show that the crack gap of the fractured experimental elastomer is well bridged after 2 hours of healing at 140 degrees Fahrenheit (60 degrees Celsius), as shown by 308. Third, it was found that the tensile strengths of the experimental elastomers gradually increase with increasing healing time until a plateau at approximately 100% of the original strength after 60 minutes (shown in FIG. 3B). However, the tensile strengths of the control elastomers reach a plateau of only 40 percent of the original strength after 60 minutes at 140 degrees Fahrenheit (60 degrees Celsius) (FIGS. 3C and 3D). This result shows that the dynamic disulfide bonds play a central role in healing the fractured interface to restore 100% strength. Without the disulfide-bond-enabled interfacial bridging, the interfacial bonding of the control elastomer possibly stems from the non-crosslinking chain entanglement around the fracture interface; however, this chain entanglement effect cannot lead to 100% interfacial self-healing.

For the experimental elastomer, self-healing tests were carried out for more than 10 cycles, and the corresponding healing strength ratios (tensile strength of the healed sample over that of the original sample) remained between 90% and 100% (FIG. 3E). It is also noted that due to the solvent-free character, the elastomer samples do not show any visible volume shrinkage during the 10-cycle healing process (each 2 hours at 140 degrees Fahrenheit (60 degrees Celsius)). This character enables the self-healing elastomer to be intrinsically different from reported directly written self-healing hydrogels. In addition, it was found that the mechanical properties of the experimental elastomer remain almost unchanged after being immersed in deionized water for 24 hours, which makes these elastomers dramatically different from the moisture-sensitive self-healing elastomers with hydrogen bonds.

Although the experimental elastomer displays a relatively low Young's modulus (~17.4 kilopascals (kPa)), the frequency sweep test verifies that its storage modulus (Young's modulus) is much larger than the loss modulus (500 to 600 Pa) over a wide frequency range (0.1-10 Hz). This result shows that the elastic character of the experimental elastomer dominates the viscous character. Additionally, the storage-loss moduli of the experimental elastomer was tested over a wide temperature range (77 to 329 degrees Fahrenheit (25 to 165 degrees Celsius)), and it was found that the elastomer remains stable and that the elastic character prevails. Moreover, this low-viscosity feature can also be verified by the cyclic tensile tests which show low hysteresis over three sequential loading-unloading cycles.

Figure 4A:
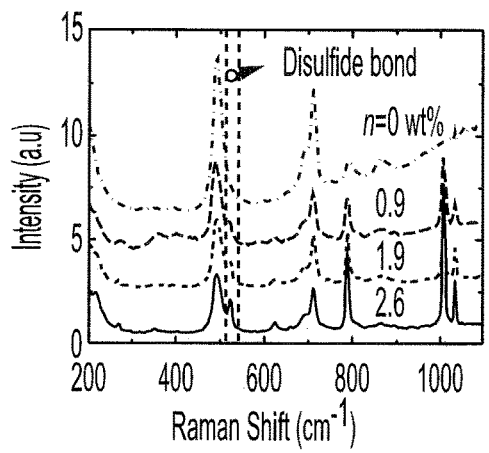
FIGS. 4A-4D illustrate various features of a competition between photocuring and self-healing of a component resulting from the method 100 of FIGS. 1A and 1B, according to various embodiments of the present disclosure.

The IBDA-enabled partial oxidation is an approach to regulate the photocuring and self-healing properties. Since the total concentration of thiol groups ($c_{T0}$) is initially provided, the concentrations of thiol ($c_T$) and disulfide groups ($c_d$) in the material ink are conserved ($c_T + 2c_d \approx c_{T0}$ if assumed that the ink volume is approximately unchanged). The number of thiol group affects the photocuring rate, and the number of disulfide group influences the healing performance; therefore, the photocuring rate and the healing efficiency are expected to be competitive. This point can first be verified by the Raman spectroscopy measurements: the Raman peak associated with the disulfide bond becomes stronger as the IBDA concentration increases (FIG. 4A, illustrating Raman spectra of the elastomer ink with various IBDA concentrations by wt %; the band at 520 cm$^{-1}$ corresponds to the disulfide bond), indicating that disulfide bond concentration increases as more oxidant IBDA is applied.

Figure 4B:
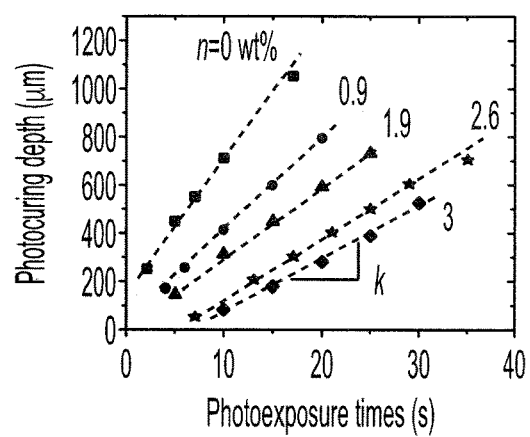

To further verify the competition, photocuring experiments were carried out to measure the relationship between the curing depth and the photoexposure time for various IBDA concentrations (FIG. 4B, showing photocuring depth off the photoelastomer ink as a function of the photoexposure time for various IBDA concentrations; the slope is defined as the photocuring coefficient k, measured in micrometers per second). It was found that the curing depth H has an approximately linear relationship with the photoexposure time t, written as $H \approx k(t-t_0)$, where k is the curing coefficient (μm/s) and to is the threshold time for the curing depth growth. The curing coefficient k represents the photocuring rate during the additive manufacturing process.

Figure 4C:
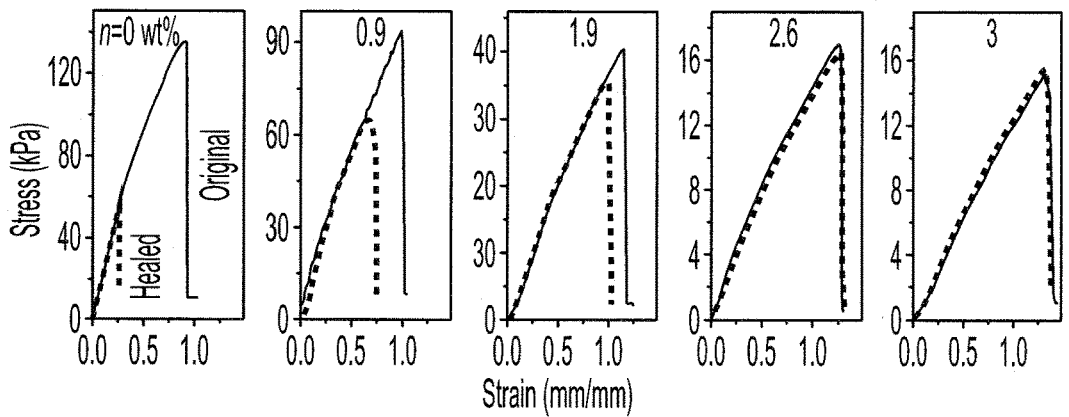
Figure 4D:
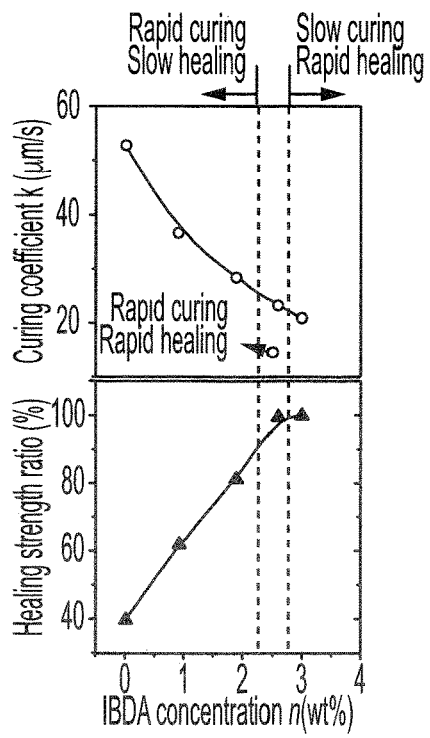

The curing coefficient k decreases with increasing IBDA concentrations (η=0 to 3 wt %) because more IBDAs transform more thiol groups to disulfide groups (as shown in FIG. 4B). At the same time, it was found that the healing strength ratios of the cured elastomers within 2 hours healing time (at 140 degrees Fahrenheit (60 degrees Celsius)) increase as the IBDA concentration increases within η=0 to 2.6 wt % (shown in FIG. 4C, which illustrates nominal stress-strain curves of the original and healed elastomers (2 hours of healing at 140 degrees Fahrenheit (60 degrees Celsius) for various IBDA concentrations)). This result confirms that the properties of photocuring and self-healing are indeed competitive, and judicious selection of the IBDA concentration is required to enable both rapid photocuring and rapid self-healing. It was further found that when the IBDA concentration is greater than $\eta_0$=2.6 wt %, the healing strength ratio reaches a plateau at 100% (shown in FIG. 4D, which illustrates the photocuring coefficients and healing strength ratios (2 hours of healing at 140 degrees Fahrenheit (60 degrees Celsius) of the photoelastomer as functions of the applied IBDA concentration; the shadow region with IBDA concentration η=2.2 to 2.8 wt % corresponds to rapid photocuring and rapid healing). To enable both rapid curing and rapid self-healing (greater than 90% within 2 hours of healing at 140 degrees Fahrenheit (60 degrees Celsius)), the IBDA concentration η=2.2 to 2.8 wt % was chosen to carry out the oxidation experiments. If the IBDA concentration is out of this range, rapid photocuring and rapid healing may not be achieved simultaneously.

Next, theoretical modeling of the self-healing behavior will be described. To theoretically understand the self-healing behavior of photoelastomers, a polymer-network-based model was created that is an extension of a model recently developed for self-healing hydrogels crosslinked by nanoparticles. The theory employs a bell-like model to analyze the stretching-induced dissociation of the dynamic disulfide bonds during the tensile loading process and a diffusion-reaction model to capture the chain interpenetration and re-cross-linking during the self-healing process. Using this theoretical model, the experimentally measured stress-strain behaviors of the original and self-healed samples can be explained. The predicted healing strength ratios also agree well with the experiments (FIG. 3D). To further verify the theory, the self-healing experiments were carried out at various temperatures (104 to 140 degrees Fahrenheit (40 to 60 degrees Celsius). The experiments show that a higher temperature leads to a more rapid healing process.

The theory can also consistently explain the experimentally measured relationships between the healing strength ratios and healing time for various temperatures. It is worth noting that the temperature plays a key role during the self-healing process. As identified from the theoretical model, the self-healing capability of the designed photoelastomer is governed by the polymer chain diffusion and disulfide group-enabled reaction across the fractured interface. A higher temperature enables the more rapid diffusion of polymer chains across the fractured interface. Additionally, according to Bell's theory, increasing the temperature will increase the vibrational excitation of the sulfide atoms and favor the reformation of disulfide bonds during the self-healing process. Both of these aspects have been well captured in the theoretical model. It is expected that this theoretical framework can be further extended to understand self-healing soft polymers with various dynamic bonds, including dynamic covalent bonds, hydrogen bonds, metal-ligand coordination, and ionic interactions.

Figure 5A:
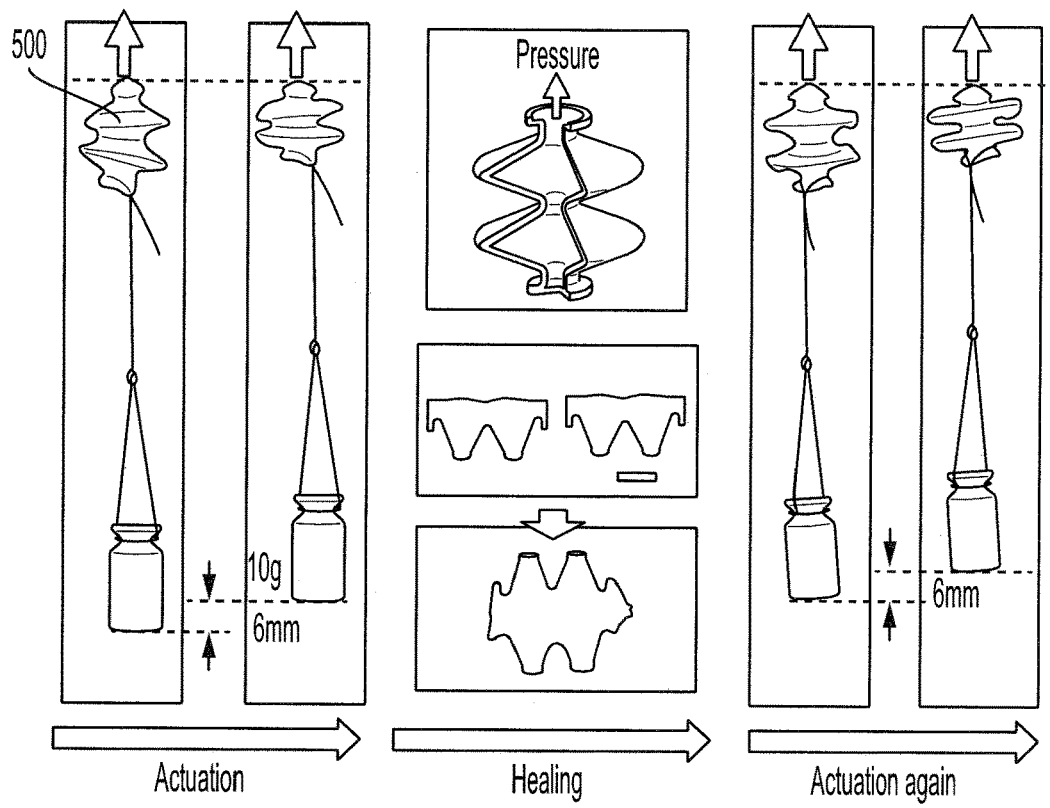
FIGS. 5A-5H illustrate various applications of additively manufactured self-healing elastomers formed using the method 100 of FIGS. 1A and 1B, according to various embodiments of the present disclosure.
Figure 5B:
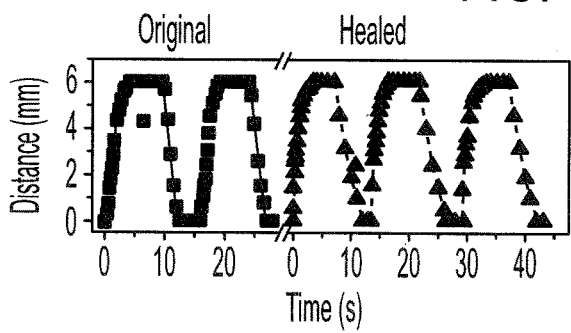
Figure 5C:
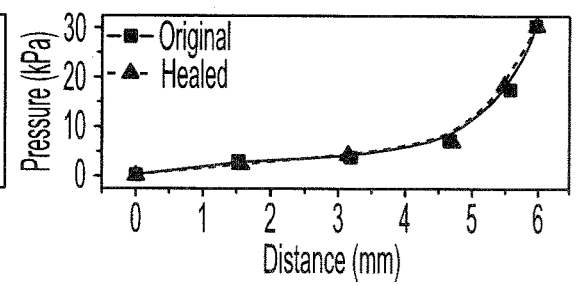

Next, applications of additively manufactured self-healing elastomers will be described, starting with a self-healable 3D soft actuator, shown in FIGS. 5A-5C. The actuator is composed of a series of circular cones that can be shrunk inward to enable a contraction when a negative pressure is applied (shown in FIG. 5A). In particular, the actuator 500 acts as follows: negative pressure actuation can enable the additively manufactured elastomer actuator to lift a 10 g weight by 6 mm. The inset shows the CAD model of the elastomer actuator. The actuator is then cut in half and brought into contact to heal for 2 hours of healing at 140 degrees Fahrenheit (60 degrees Celsius). The self-healed actuator can be actuated again by the negative pressure to lift the 10 g weight by 6 mm. The scale bar represents 5 mm. Once the actuator is self-healed, it can lift the 10 g weight a distance 6 mm again (FIGS. 5A and 5B). FIG. 5B illustrates the cyclic lifting distance of the 10 g weight as a function of time of the original and self-healed actuators. The pressure-distance curve of the healed sample is very similar to that of the original one (as shown in FIG. 5C, which shows relationships between negative pressure values and the lifting distances of the original and self-healed actuators). This lifting efficiency (lifting weight per self-weight) is comparable with existing contraction actuators that are fabricated with molding or assembly methods. Compared with the soft actuators fabricated using the traditional molding method, the stereolithography-enabled fabrication of the self-healable soft actuator requires less time and material consumption. Compared with the additive manufacturing-enabled soft actuators composed of non-healable materials, this soft actuator harnesses the self-healing elastomers to enable 100% healing after fatal fractures.

Figure 5D:
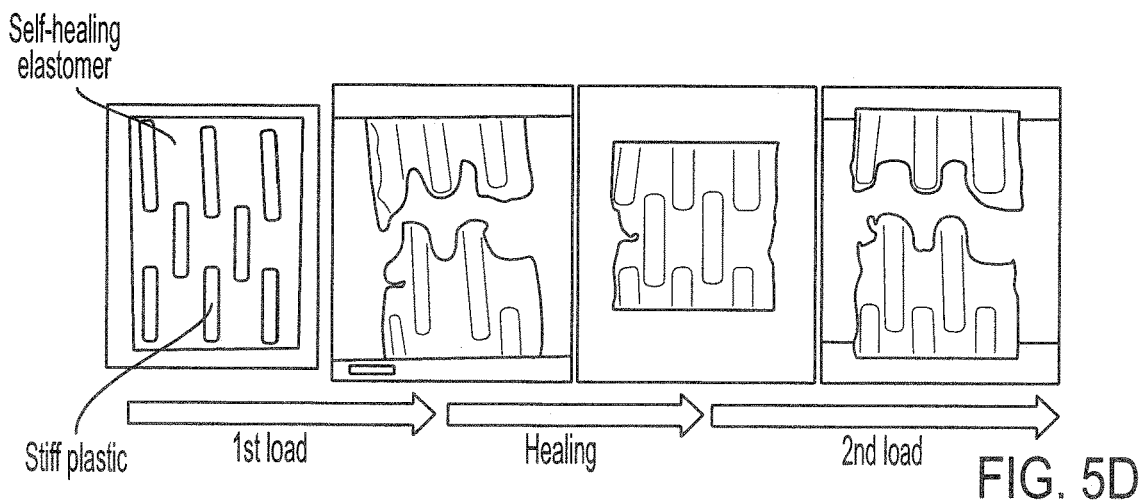
Figure 5E:
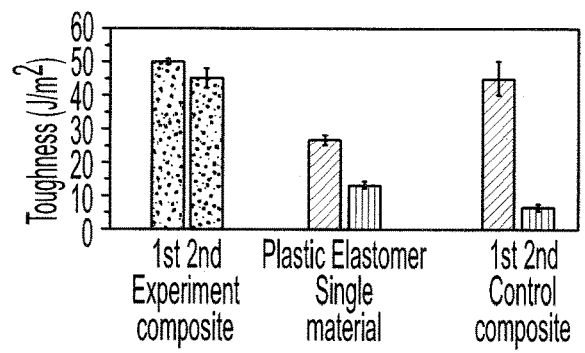

Next, self-healable structural composites were created. Natural structural materials, such as nacres and teeth, feature outstanding toughness, primarily due to their multiphase composition in which both stiff and soft phases are arranged in complex architectures. These structural composites motivate tremendous efforts in creating tough synthetic composites with multiple phases; however, these natural and synthetic composites are generally not self-healable. Here, additive manufacturing of a healable nacre-like composite composed of a non-healable stiff plastic phase and a healable soft elastomer phase was created (as shown in FIG. 5D, which illustrates that a notched stiff-soft composite is first uniaxially stretched until a rupture and then brought into contact to heal for 2 hours of healing at 140 degrees Fahrenheit (60 degrees Celsius); the healed composite is then uniaxially stretched again until a rupture; the scale bar represents 3 mm). During the photopolymerization enabled additive manufacturing process, a thiol-acrylate reaction is triggered to enable a relatively strong interfacial bonding between the two phases. Under a tensile load, the crack in the composite sample (with a small crack notch) propagates through the soft phase in a wavy pattern, inducing a greater toughness than the parent materials (shown in FIG. 5E, which illustrates the toughness of the original and healed experimental composites, single materials (pure plastic and pure elastomer), and the original and healed control composites; the toughness is defined as the enveloped area of the uniaxial nominal stress-strain curves until the rupture per unit sample area). Since the crack propagates through the soft phase, the two fractured parts were brought back together to heal for 2 hours at 140 degrees Fahrenheit (60 degrees Celsius). After the healing process, the sample can sustain the tensile load again, and the toughness is approximately 90% of that of the original composite. As a control experiment, a stiff-soft composite with non-healable soft elastomers was manufactured that only shows 14.5% of the original toughness in the second load.

Figure 5F:
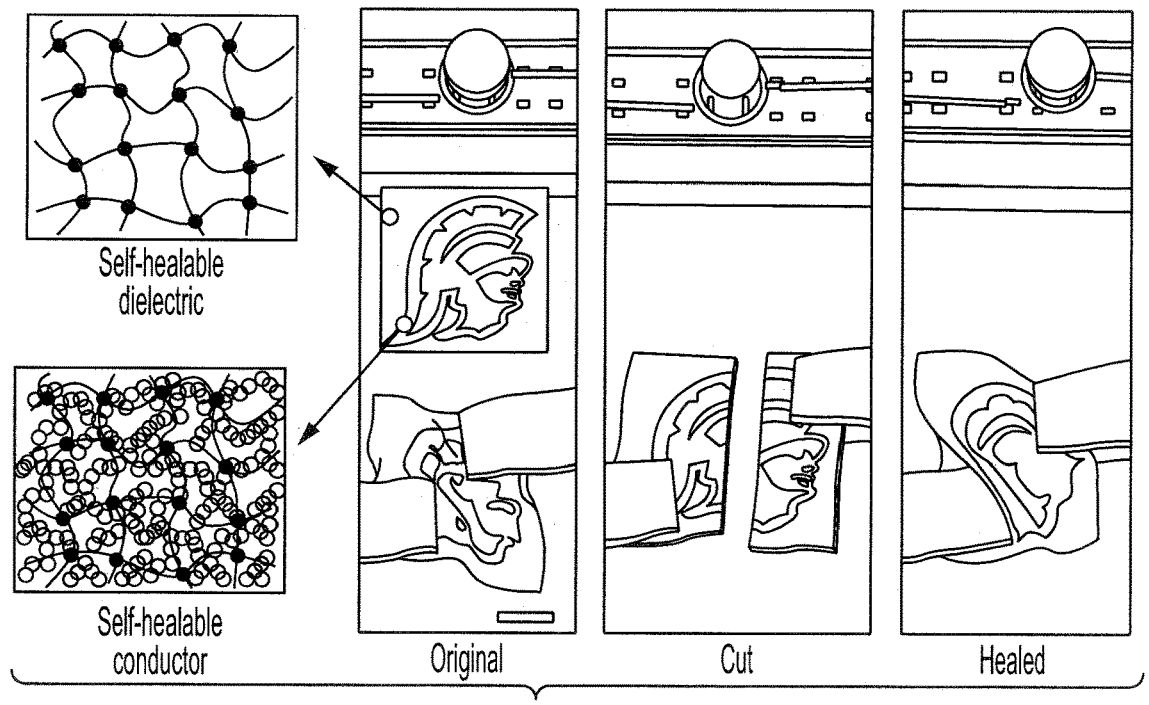
Figure 5G:
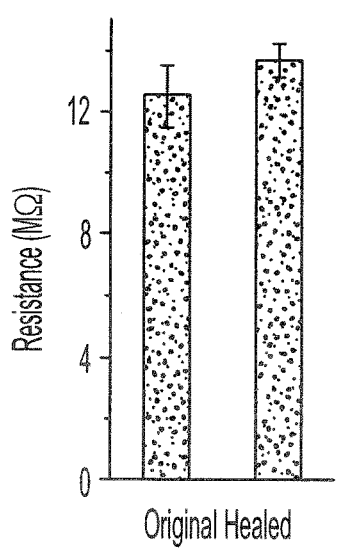
Figure 5H:
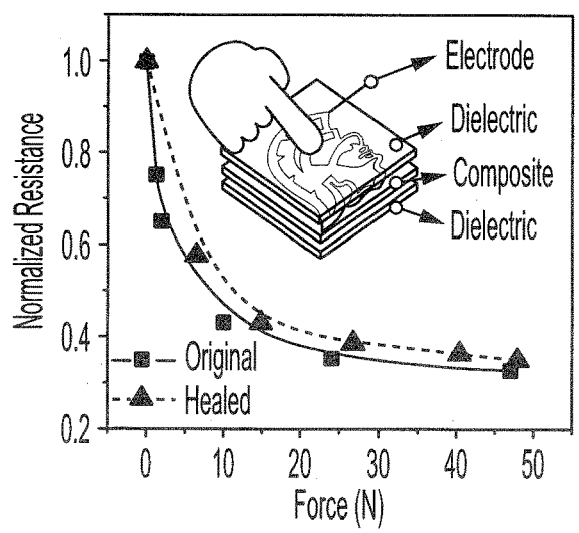

Next, self-healing architected electronics were created. The self-healing photoelastomer is dielectric; to enable electronic conductivity, carbon-blacks were doped into the elastomer ink (as shown in FIG. 5F, which shows a flexible Trojan pad with a self-healable elastomer phase and a self-healable conductor phase that can power an LED; once cut and healed after 4 hours at 140 degrees Fahrenheit (60 degrees Celsius), the self-healed Trojan pad can again sustain bending and power the LED; the scale bar represents 4 mm). In particular, a flexible composite pad with a dielectric elastomer phase and a conductive elastomer phase was manufactured with a contour path of the USC Trojan. It is shown that that the sample is conductive along the Trojan path to power an LED, and can also be bent at a large angle (approximately 120 degrees). Since both phases in the composite pad are self-healable, two parts were brought back to heal at the interface for 4 hours at 140 degrees Fahrenheit (60 degrees Celsius). The healed pad becomes conductive again and can be used to power the LED. It was found that the resistance of the healed sample only changes by 9% (shown in FIG. 5G, which illustrates the resistance of the conductive path of the Trojan before and after self-healing). The composite pad can be used as a self-healable force sensor, as the resistance of the conductive pathway decreases with an increase in the compressive force (as shown in FIG. 5H, which illustrates the relationships between the normalized resistances and the applied force of the original and self-healed force sensors; the normalized resistance is calculated as the resistance normalized by the resistance for the force-free state; the inset shows the working paradigm of the force sensor). This result is likely due to the effective spacing between carbon black particles within the conductor becoming smaller when a compressive force is applied. The relationship between the relative resistance and the applied force can be used as a sensing signal to inversely predict the applied force. When the structure was cut and healed back for 4 hours at 140 degrees Fahrenheit (60 degrees Celsius), a self-healed force sensor was obtained with the resistance-force curve close to that of the original force sensor.

In summary, the present disclosure presents a molecularly designed photoelastomer ink that can enable stereolithography-based additive manufacturing of elastomers with rapid and full self-healing. The dual functions of photopolymerization and self-healing are achieved by molecularly balancing the thiol and disulfide groups in the material ink. As a model self-healing photoelastomer, the material system with adequate modifications should be easily translatable to other photopolymerization-based additive manufacturing systems, such as self-propagation photopolymer waveguide, two-photon lithography, and PolyJet printing. The additive manufacturing of self-healing elastomers with various tailored 3D architectures is expected to open various application possibilities not limited to the demonstrated 3D soft actuators of FIGS. 5A-5C, structural composites of FIGS. 5D and 5E, and flexible electronics of FIGS. 5F-5H, but may also include artificial organs, biomedical implants, and bionic sensors and robotics. In addition, in nature, the disulfide bond is a reversible cross-link that provides tunable stability to folded structures of proteins with specific mechanical functions, such as molecular sensing, switching, and signaling. The additive manufacturing of biomimetic materials with dynamic disulfide bonds may open possibilities for materials with protein-like functions. Moreover, as a model system to incorporate desirable material properties (i.e., self-healing) into the existing additive manufacturing system, the molecular design strategy may be extended to various other salient properties, such as stimulus actuation and mechanochromism. To that end, the presented strategy may motivate molecular designs of various unprecedented material inks for emerging additive manufacturing systems to enable rapid prototyping of 3D structures that cannot be fabricated with traditional shaping methods.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method of making a photocurable elastomeric ink configured for use in photopolymerization-enabled additive manufacturing of a self-healing product, the method comprising:
   providing a dimethylsiloxane copolymer comprising reactive thiol groups;
   partially oxidizing the thiol groups with an oxidizing agent to form a thiol-disulfide crosslinked oligomer comprising both unreacted thiol groups and disulfide crosslinks; and
   reacting the thiol-disulfide oligomer with a vinyl-terminated polydimethylsiloxane to form the photocurable elastomeric ink;
   wherein the photocurable ink comprises both unreacted thiol groups and embedded disulfide crosslinks;
   wherein the oxidizing agent comprises from about 2.2 wt. % to about 2.8 wt. % Iodobenzene Diacetate (IBDA), based on the total weight of the photocurable elastomeric ink.

2. The method of claim 1, wherein the dimethylsiloxane copolymer comprises (mercaptopropyl)methylsiloxane-dimethylsiloxane copolymer.

3. The method of claim 1, further comprising adding an aryl phosphine to the photocurable elastomeric ink after reacting the thiol-disulfide oligomer with the vinyl-terminated polydimethylsiloxane.

4. The method of claim 3, further comprising adding a photoinitiator and a photoabsorber to the photocurable elastomeric ink after adding the aryl phosphine.

5. The method of claim 1, wherein the oxidizing agent comprises a solution of Iodobenzene Diacetate (IBDA) in toluene.

6. The method of claim 4, wherein the photoinitiator comprises phenylbis(2,4,6-trimethylbenzoyl)phosphine oxide, and the photoabsorber comprises Sudan I.

7. A method of making a photocurable elastomeric ink configured for use in photopolymerization-enabled additive manufacturing of a self-healing elastomeric product, the method comprising:
   partially oxidizing (mercaptopropyl)methylsiloxane-dimethylsiloxane copolymer with an oxidizing solution comprising an iodonium salt to form a first intermediate solution containing a thiol-disulfide oligomer having both unreacted thiol groups and disulfide crosslinks;
   adding a vinyl-terminated polydimethylsiloxane to the first intermediate solution to produce a second intermediate solution;
   adding an aryl phosphine to the second intermediate solution to form a third intermediate solution; and
   adding a photoinitiator and a photoabsorber to the third intermediate solution to form the photocurable elastomeric ink,
   wherein the photocurable elastomeric ink comprises unreacted thiol groups for photopolymerization-enabled additive manufacturing and disulfide crosslinks to promote self-healing properties to the self-healing elastomeric product produced from the photocurable elastomeric ink;
   wherein from about 2.2 wt. % to about 2.8 wt. % of iodobenzene diacetate (IBDA), based on the total weight of the photocurable elastomeric ink, is used to partially oxidize the (mercaptopropyl)methylsiloxane-dimethylsiloxane copolymer.

8. The method of claim 7, wherein the oxidizing solution comprises a solution of iodobenzene diacetate (IBDA) in toluene.

9. The method of claim 7, wherein the vinyl-terminated polydimethylsiloxane has a molecular weight of about 6,000 to 20,000 g/mol.

10. The method of claim 7, wherein the aryl phosphine comprises tributylphosphine (TBP).

11. The method of claim 7, wherein the photoinitiator comprises phenylbis(2,4,6-trimethylbenzoyl)phosphine oxide.

12. The method of claim 7, wherein the photoabsorber comprises Sudan I.

* * * * *